Patented Sept. 14, 1948

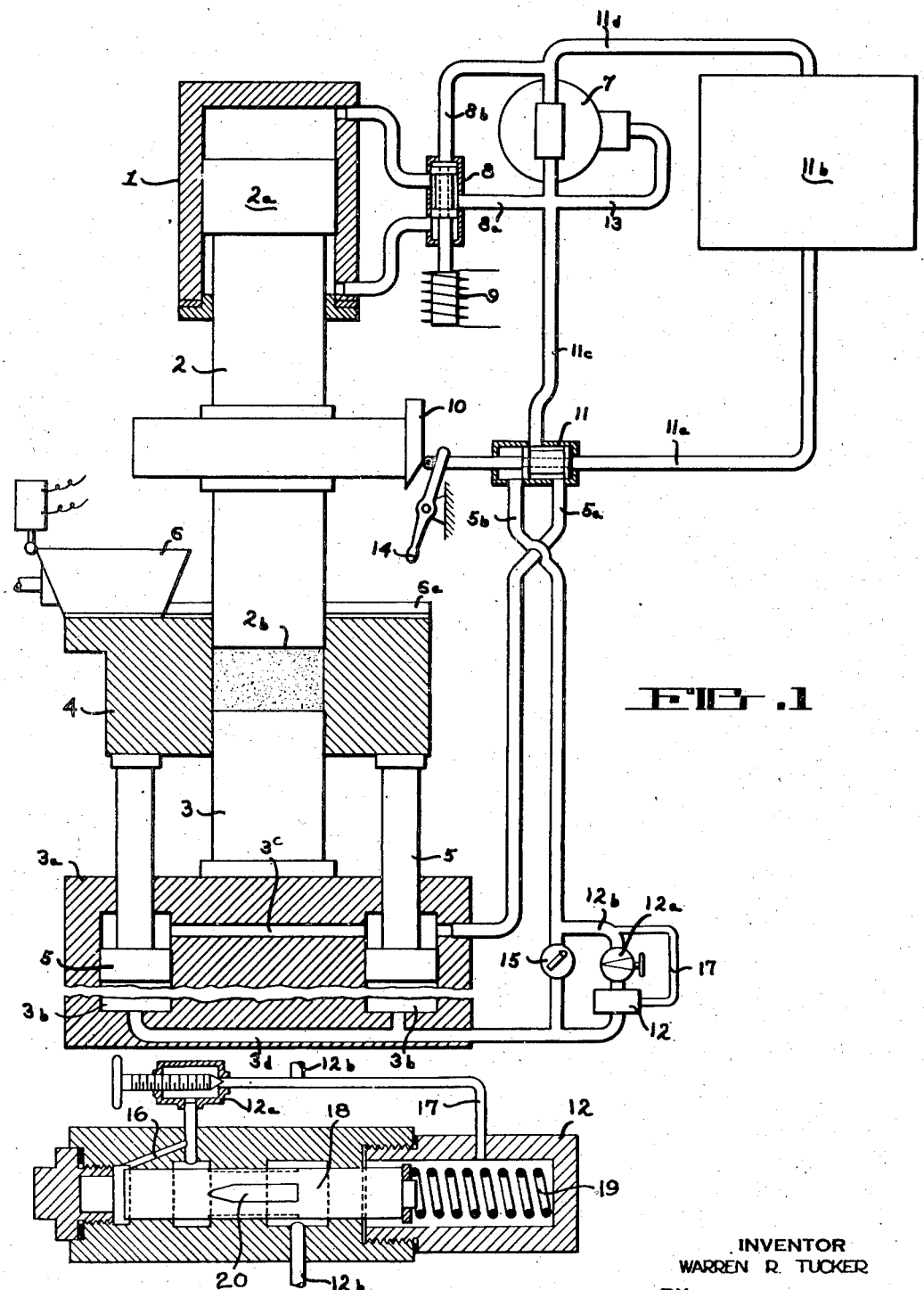

2,449,257

UNITED STATES PATENT OFFICE 2,449,257

PRESS FOR POWDERED METALS

Warren R. Tucker, Dayton, Ohio, assignor to The H-P-M Development Corporation, a corporation of Delaware Application September 1, 1942, Serial No. 456,961

1 Claim. (Cl. 78—0.5)

My invention relates to the pressing or briquetting of various powdered or granular materials, in particular of powdered metals, and also relates to an apparatus and method for producing bodies of powdered or granular materials.

It has been found that, in the molding of powdered metals, it is advantageous to maintain uninterrupted movement of the die parts relatively to the powder, both from the standpoint of the surface quality and homogeneity of the finished molding, and the preservation of the mold surfaces. This principle is based on the prevention of adherence between the powder and the mold under high pressures as well as high temperatures.

It is the main object of this invention to provide a press for molding powdered metals which will provide a continuous relative motion between the powder and the mold members, from the beginning of the pressing operation to the ejection of the finished product from the press.

More specifically, it is the object of the invention to provide for a moving mold in conjunction with the moving pressing plunger, the movement of the floating mold being such that it will proceed in the same direction as the main ram during the pressing operation, and that particularly, its movement will be controlled, taking place without an interruption, and at a definite rate.

Another object of the present invention is to provide for the compression of the metal uniformly throughout the body of the metal to produce a compressed body of homogeneous and uniform character throughout. I have discovered that by moving the mold and particularly moving it at a controlled rate synchronous with the movement of the pressing plunger, and also providing synchronous movements for removing the plunger and stripping the mold from the press body, the finished product is homogeneous and uniform in density and generally superior in strength to similar articles produced by prior art molding presses.

Referring to the drawings:

Figure 1 is a diagrammatic view, partially in section, of a press embodying the features of this invention;

Figure 2 is an enlarged section through the speed control valves for the movable mold.

It will be understood that these drawings are diagrammatic, and that the usual controls of electrical or mechanical character have been omitted for the purpose of clarity.

Referring to the drawings in detail:

1 is the main ram cylinder in which a conventional pressing member or plunger 2 reciprocates. On the head of the plunger 2 is the piston 2a. A punch integral with the plunger 2 engages at 2b with the top of the powdered metal body. The powdered metal body is contained within the movable mold 4. This mold moves downward during the pressing operation at a fraction of the rate of the pressing plunger 2. After pressing is completed, it continues further downwardly to strip the finished powdered metal briquette from the mold by moving relatively to a stationary punch or platen 3. The powdered metal briquette then rests upon this stationary punch 3, which is mounted on the bed 3a. This bed 3a is provided with cylinders 3b. The top and bottom of the cylinders are interconnected by the pipes or passageways 3c and 3d. The pistons and piston rods 5 which are connected to the floating mold 4 operate within the cylinders 3b.

The powdered metal is fed into the space into which it is pressed, from the reciprocating feeding hopper 6 guided by the guides 6a on top of the floating mold 4.

Operating mechanism

The operating mechanism consists of a fluid pressure pump 7 which delivers fluid through the 4-way control valve 8 either to the top of the piston 2a or to the bottom to control the movement of the pressing plunger 2. This valve 8 is shifted by the solenoid shifter 9. The pressure supply line for the valve is numbered 8a, and its drain line 8b.

Moving integrally with the pressing member is a cam 10, the function of which is to shift 3-way valve 11 at a predetermined point near the beginning of the actual pressing of the powdered metal. This shifting of valve 11 admits pressure from pump 7 to the upper area of pistons 5 to start the controlled downward movement of mold 4. At this stage of operation, the pressure fluid flows from valve 11 into line 5a. At a later stage, when mold 4 is returned to starting position, fluid passes from the valve into line 5b. The exhaust fluid from valve 11 passes through line 11a to a storage tank 11b. Pressure fluid from the pump is received by the valve through line 11c.

The rate of advance of mold 4 is controlled by valving mechanism located on the discharge side of pistons 5. As these pistons move downwardly under the delivery of pressure fluid into line 5a, pistons 5 force fluid in the lower ends of cylinders 3b outwardly towards valve 11, by way of line 5b. Interposed between these cylinders and line 5b, however, is the speed control mechanism, consisting of valves 12 and 12a, located in the line 12b which bypasses a check valve 15. Valves 12 and 12a are shown more fully in section in Figure 2. The operation of these valves in maintaining a predetermined rate of flow from the discharge side of pistons 5 will be described presently. The purpose of check valve 15 is to permit free flow of fluid from the pump to the undersides of pistons 5 to produce the return movement of mold 4.

Method of operation

Considering the stage of operation illustrated in Figure 1, the pump 7 is delivering to the top of cylinder 1 through control valve 8, which has previously been shifted through the energization of solenoid 9. Punch 2 has engaged the powder and is compacting it within the confined area formed by the mold 4 and stationary punch 3. The cam 10 traveling with the pressing plunger has contacted the plunger of 4-way valve 11 and pressure fluid is now flowing to the tops of cylinders 3b in the base of the press.

This is the beginning of the vital stage in the operation. The flow to cylinders 3b imparts positive downward movement to mold 4, and, in conjunction with the flow regulating unit 12 and 12a, determines the exact rate of this movement. The rate will be slower than that of punch 2, but its exact value is adjusted by manual pre-setting of the regulating unit, to best suit the requirements of the particular job.

Shortly after the pressing stage illustrated in the drawings, the workpiece will be sufficiently compressed, whereupon the plunger 2 will be retracted. The reversal may be initiated in any manner, such as by the actuation of a pressure control switch which deenergizes solenoid 9 and causes valve 8 to be shifted to reverse position. Meanwhile, fluid is still being delivered to the tops of cylinders 3b, causing the mold member 4 to continue its downward stroke uninterruptedly, and thus maintaining relative movement of the die with the powdered metal. This motion stops only when the workpiece is completely ejected from the mold member.

This may be considered the end of an operation, since no further movements of the press are necessary to the ejected workpiece. The plunger 2 is now at rest in its uppermost position, while mold 4 is at rest in its lowermost position, with valves 8 and 11 remaining in their corresponding positions, and pump 7 standing at neutral delivery position under its own pressure acting through line 13 against a pump control unit.

A new cycle will be started when charging box 6 is moved in, whether manually or automatically, to push the workpiece out of the press. The mechanism for thus initiating a cycle may consist of the lever 14 which shifts the valve 11 to reverse position when engaged by the charging box. Upon the shifting of the valve, fluid flows to the undersides of plungers 5 to move mold 4 upwardly, drawing a new charge of powdered metal from box 6. Check valve 15 by-passes the flow control unit to permit this movement to take place at an unrestricted rate of speed.

As soon as mold 4 is fully charged, box 6 is pulled out, and the downstroke of plunger 2 is ready to start. This may be initiated by placing a limit switch 22 at a position to be engaged by the fully withdrawn charging box, this limit switch serving to reenergize valve solenoid 9 through a suitable electrical relay.

Referring now to Figure 2, a brief explanation of the functioning of the speed control valves 12 and 12a will be given. This figure shows the main valve units of the patent to Farnham No. 2,146,537, attention being directed to this patent for a detailed explanation.

Valve 12 is an automatically responsive, pressure controlled choke valve, its purpose being to maintain a constant pressure drop across the inlet and outlet of valve 12a, with which it is serially connected. Valve 12a is also a choke valve, but is fixed during operation, being manually set to a predetermined degree of restriction.

In order to maintain a constant pressure drop across valve 12a, and therefore a constant flow through this valve, valve 12 is connected by branches 16 and 17 to the inlet and outlet, respectively, of valve 12a. Pressure in these branches acts in opposing directions upon the valve plunger 18, the outlet pressure in line 17 being aided by spring 19 in establishing equilibrium of the plunger at various positions.

Plunger 18 has tapered openings 20 which offer restriction to the flow of fluid in line 12b in accordance with the positions of this plunger. Any tendency for the flow to change through the system will cause valve 12 to move in the direction required to maintain the pressure drop preselected at valve 12a.

While the invention has been described in connection with the manufacture of powdered metal bodies, it is, of course, understood that the invention is not limited to powdered metal but is also applicable to advantage in the pressing or briquetting of other powdered or granular materials.

It will be understood that I desire to comprehend within my invention such modifications as come within the scope of the claim.

Having thus fully described my invention, what I claim as new and desire to secure by Letters Patent is:

In combination in a press, a pressing member, a platen, a floating mold having a cavity into which said member and platen are movable from opposite ends thereof to press material therebetween, means for actuating the pressing member, means for actuating the floating mold over said platen in the same direction as the pressing member, means for regulating the rate of movement of the floating mold to a lesser rate of speed than the pressing member, means for continuing the movement of the floating mold in the same direction to strip it from the work being pressed, and means for retracting the pressing member.

WARREN R. TUCKER.

REFERENCES CITED

The following references are of record in the file of this patent:

UNITED STATES PATENTS

| Number | Name | Date |
|---|---|---|
| 778,899 | Ronay | Jan. 3, 1905 |
| 1,461,093 | Kershner | July 10, 1923 |
| 1,473,389 | Smith et al. | Nov. 6, 1923 |
| 1,922,513 | Wiedmann | Aug. 15, 1933 |